United States Patent
Revol

(10) Patent No.: US 11,022,694 B2
(45) Date of Patent: Jun. 1, 2021

(54) METHOD OF CHECKING THE INTEGRITY OF THE ESTIMATION OF THE POSITION OF A MOBILE CARRIER IN A SATELLITE-BASED POSITIONING MEASUREMENT SYSTEM

(71) Applicant: THALES, Courbevoie (FR)

(72) Inventor: Marc Revol, Upie (FR)

(73) Assignee: THALES, Courbevoie (FR)

( * ) Notice: Subject to any disclaimer, the term of this patent is extended or adjusted under 35 U.S.C. 154(b) by 296 days.

(21) Appl. No.: 16/235,519

(22) Filed: Dec. 28, 2018

(65) Prior Publication Data

US 2019/0204450 A1 Jul. 4, 2019

(30) Foreign Application Priority Data

Dec. 28, 2017 (FR) ...................................... 1701391

(51) Int. Cl.
| | |
|---|---|
| G01S 19/20 | (2010.01) |
| G01S 19/42 | (2010.01) |
| G01S 19/52 | (2010.01) |
| G01S 19/43 | (2010.01) |
| G01S 19/07 | (2010.01) |
| G01S 19/04 | (2010.01) |
| G01S 19/25 | (2010.01) |
| H04W 64/00 | (2009.01) |

(52) U.S. Cl.
CPC .............. *G01S 19/20* (2013.01); *G01S 19/04* (2013.01); *G01S 19/07* (2013.01); *G01S 19/071* (2019.08); *G01S 19/074* (2019.08); *G01S 19/252* (2013.01); *G01S 19/425* (2013.01); *G01S 19/43* (2013.01); *G01S 19/52* (2013.01); *H04W 64/003* (2013.01)

(58) Field of Classification Search
CPC ........ G01S 19/20; G01S 19/29; G01S 19/246; G01S 19/074; G01S 19/08; G01S 19/04; G01S 19/07; G01S 19/071; G01S 19/252; G01S 19/43; G01S 19/44; G01S 19/54; G01S 19/52; G01S 19/393; G01S 19/396; H04W 64/003
USPC ....... 342/357.58, 45, 26, 27, 37, 38, 41, 580
See application file for complete search history.

(56) References Cited

U.S. PATENT DOCUMENTS

| | | | |
|---|---|---|---|
| 6,169,957 B1 | 1/2001 | Arethens | |
| 6,373,432 B1 * | 4/2002 | Rabinowitz | ............. G01S 19/11 |
| | | | 342/357.29 |

(Continued)

*Primary Examiner* — Erin F Heard
*Assistant Examiner* — Michael W Justice
(74) *Attorney, Agent, or Firm* — BakerHostetler

(57) ABSTRACT

Methods of checking the integrity of the estimation of the position of a mobile carrier are provided, the position being established by a satellite-based positioning measurement system, the estimation being obtained by the so-called "real time kinematic" procedures. The method verifies that the carrier phase measurement is consistent with the code pseudo-distance measurement. The method comprises a step of calculating the velocity of the carrier, at each observation instant, a step of verifying that at each of the observation instants, the short-term evolution of the carrier phase of the signals received on each of the satellite sight axes is consistent with the calculated velocity and a step of verifying that at each of the observation instants, the filtered position obtained on the basis of the long-term filtered measurements of pseudo-distance through the carrier phase is dependable.

3 Claims, 5 Drawing Sheets

(56) References Cited

U.S. PATENT DOCUMENTS

| | | | |
|---|---|---|---|
| 8,131,463 B2* | 3/2012 | Lopez | G01S 19/20 |
| | | | 701/469 |
| 8,803,736 B2* | 8/2014 | Dai | G01S 19/44 |
| | | | 342/357.62 |
| 9,405,012 B2* | 8/2016 | Doucet | G01S 19/25 |
| 9,599,721 B2* | 3/2017 | Dai | G01S 19/235 |
| 10,605,926 B2* | 3/2020 | Lie | G01S 19/43 |
| 10,802,160 B2* | 10/2020 | Dai | G01S 19/44 |
| 2002/0050944 A1* | 5/2002 | Sheynblat | G01S 19/28 |
| | | | 342/357.25 |
| 2005/0231423 A1* | 10/2005 | Han | G01S 19/44 |
| | | | 342/357.27 |
| 2006/0047413 A1 | 3/2006 | Lopez et al. | |
| 2006/0074558 A1* | 4/2006 | Williamson | G01S 19/20 |
| | | | 701/469 |
| 2010/0033370 A1* | 2/2010 | Lopez | G01S 19/08 |
| | | | 342/357.29 |
| 2011/0210889 A1* | 9/2011 | Dai | G01S 19/235 |
| | | | 342/357.29 |
| 2013/0120187 A1* | 5/2013 | Dai | G01S 19/235 |
| | | | 342/357.27 |
| 2013/0271318 A1* | 10/2013 | Doucet | G01S 19/44 |
| | | | 342/357.64 |
| 2016/0011318 A1* | 1/2016 | Cohen | G01S 19/45 |
| | | | 342/357.26 |
| 2016/0109579 A1* | 4/2016 | Navarro Madrid | G01S 19/393 |
| | | | 342/357.62 |
| 2017/0070971 A1* | 3/2017 | Wietfeldt | G01S 19/03 |
| 2020/0041658 A1* | 2/2020 | Laurichesse | G01S 19/32 |

* cited by examiner

METHOD OF CHECKING THE INTEGRITY OF THE ESTIMATION OF THE POSITION OF A MOBILE CARRIER IN A SATELLITE-BASED POSITIONING MEASUREMENT SYSTEM

CROSS-REFERENCE TO RELATED APPLICATIONS

This application claims priority to foreign French patent application No. FR 1701391, filed on Dec. 28, 2017, the disclosure of which is incorporated by reference in its entirety.

FIELD OF THE INVENTION

The general field of the invention relates to the consolidation of the integrity of high-precision positioning procedures accessible through constellations of GNSS satellites, the acronym standing for "Global Navigation Satellite System". A favoured field of application of the invention is that of the navigation of drones. New regulations governing the use of drones are gradually leading drones to carry on board autonomous and dependable positioning systems which meet the safety objectives fixed by aeronautical authorities. For certain operations of drones, positioning must be carried out with high precision to ensure the precise referencing of the on-board equipment.

BACKGROUND

A defect of integrity of the position delivered by a satellite navigation system of GNSS type consists of the existence of a bias in the position measurement of greater than a given threshold, without this estimation error being detected by the system. In aeronautics, the estimated GNSS position is at every instant associated with a protection radius, making it possible to evaluate the volume inside which it is not possible to guarantee, for a given confidence, the detection of a position bias. The sources of the biases may be found in undeclared faults of the satellites, errors related to the propagation of the signals or defects related to the receivers of these signals. The barriers which specifically ensure the monitoring of satellite faults are known by the general acronym of "RAIM", standing for "Receiver Autonomous Integrity Monitoring". Various types exist, known by the acronyms "RAIM-FDE", standing for "RAIM—Fault Detection and Exclusion", "RAIM_SBAS", standing for "RAIM_Satellite Based Augmentation System" or "ARAIM", standing for "Advanced RAIM".

These algorithms, defined for aeronautical operations, are used to verify the integrity of the position calculated on the basis of the pseudo-distance measurements formulated from the estimations of arrival dates accessible through so-called "BPSK" wideband spreading codes, the acronym standing for "Binary Phase Shift Keying". Similar algorithms, based on the measurements of phase increments of the carrier of the signals, are also usable to verify the consistency of the velocity estimation calculated on the basis of the integrated-doppler measurements. U.S. Pat. No. 6,169,957 entitled "Satellite signal receiver with speed computing integrity control" will be cited by way of exemplary embodiment.

The risk of LOPs of integrity depends on the probability of non-detection of these error monitoring algorithms, and also on the occurrence of the feared events generated at the level of the satellites such as faults which are not detected by the satellite system. Thus, only the integrity of the position estimation calculated on the basis of the measurements of pseudo-distances can be verified, since the providers of GNSS services currently guarantee only the rate of defects existing in the pseudo-distances and not in the measurements related to the carrier phase.

Despite the diversity of procedures capable of providing high-precision GNSS positioning measurements on the basis of the so-called "PPP" technique, the acronym standing for "Precise Point Positioning", or "RTK" technique, the acronym standing for "Real Time Kinematic", and despite the advent of dual-frequency constellations which simplify the precise positioning algorithm and render it more robust, it is still not possible for a risk of loss of integrity to be associated with them, thus rendering them difficult to utilize for "SOL" applications, the acronym standing for "Safety Of Life".

Hence, receivers certified for aeronautical operations use only the pseudo-distance measurements to carry out the calculation of the position. The integrity of the position solution is evaluated by the receiver on the basis of the dispersion of the pseudo-distance errors which is calculated on the basis of the least squares residuals of the pseudo-distance measurements. The doppler measurements, which are characteristic of the evolution of the phase of the carrier related to the relative displacement, are not, for their part, used to consolidate the integrity, whilst they provide much more significant details than the code and, potentially, would make it possible to achieve much smaller protection radii for managing the relative displacement.

The PPP and RTK techniques, deployed in the field of geodesy, make direct use of the satellite carrier phase measurements, and are known to provide position details of decimetre or indeed centimetre precision, but with no capability of ensuring the integrity of the position measurement.

Several attempts have however been advanced to carry out the monitoring of the integrity of the RTK point, on the basis of the measurements of phases and of their ambiguities, but the latter are limited to low-dynamics carriers or to analyses by post-processing or requiring a latency that is incompatible with time-real monitoring of errors. Moreover, the unknown weighing on the rate of occurrence of defects of the carrier phase emitted by the satellite does not make it possible to guarantee a priori the risk of loss of integrity of precise measurements such as these.

SUMMARY OF THE INVENTION

The method according to the invention makes it possible to provide real-time monitoring of the positioning biases which is derived from the carrier phase of the GNSS signals and which is not limited to low-dynamics operations of the carrier. It can be implemented in any satellite-based positioning system compatible with the so-called "Real Time Kinematic" technique, also known as "RTK".

More precisely, the subject of the invention is a method of checking the integrity of the estimation of the position of a mobile carrier, the said position being established by a satellite-based positioning measurement system, the said estimation being obtained by the so-called "real time kinematic" procedures, the said procedures being based on the measurements of carrier phase of the so-called "GNSS" signals arising from the satellites, the said method verifying that a carrier phase measurement is consistent with a code pseudo-distance measurement, characterized in that the said method comprises:

a first step E1 of calculating the initial position and the initial time of the carrier, the said first step carried out on the basis of the pseudo-distances estimated on the sight axes of the satellites, based on the time measurements received carried by the spreading codes of the signals emitted by the satellites;

a second step E2 verifying the integrity of the resolution of initial position and of initial time carried out on the basis of the satellite pseudo-distances carried out on the basis of a standard algorithm for monitoring satellite faults of "RAIM" type;

a third step E3 of calculating the velocity of the carrier, at a plurality of observation instants, the said third step being carried out on the basis of the apparent-doppler measurements estimated on the satellite sight axes, on the basis of the satellite signals carrier phase measurements;

a fourth step E4 of verifying that at each of the said observation instants, the short-term evolution of the carrier phase of the signals received on each of the satellite sight axes is consistent with the velocity calculated at the previous step;

a sixth step E6 and E7 of verifying that at each of the said observation instants, the filtered position obtained on the basis of the long-term filtered measurements of pseudo-distance through the carrier phase is dependable.

Advantageously, the method comprises an eighth step E8 of resolving the phase integer ambiguities in the uncertainty domain associated with the filtered position.

Advantageously, the method comprises a ninth step of calculating the "real time kinematic" position on the basis of the carrier phase measurements E9 and a tenth step E10 of verifying the final integrity of the position consisting in applying a standard algorithm for monitoring satellite faults of "RAIM" type to the differential phase residuals making it possible to ensure the final integrity of the differential-position calculation and in associating a protection radius therewith.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
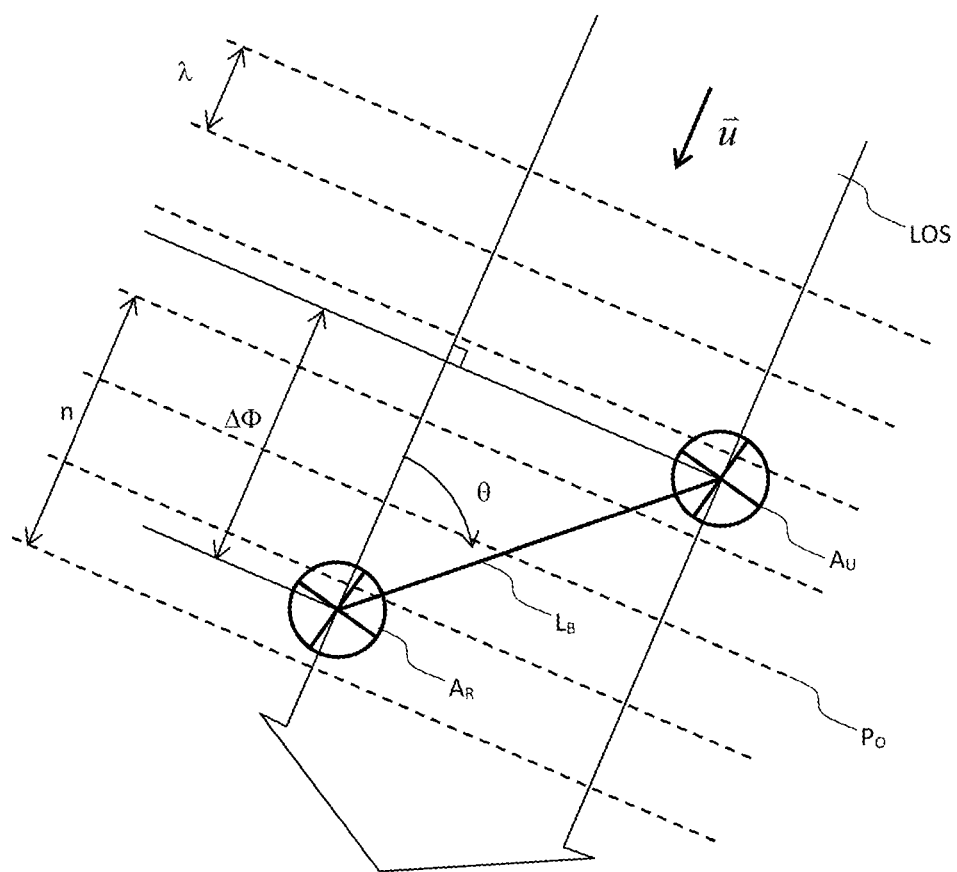
FIG. 1 represents the general principle of the "RTK"-based positioning procedure.

The method according to the invention is implemented in GPS-Galileo dual-constellation GNSS receivers of "DFMC" type, the acronym standing for "Dual Frequency Multi Constellation Receiver". The method according to the invention requires simple adaptations of the basic processing of the position so as to add checks making it possible to ensure the integrity of the positioning measurement. These adaptations are within the scope of the person skilled in the art, a specialist in satellite-based positioning systems.

In the subsequent description, the expression "short term" corresponds to the tempo of calculation of the GNSS velocity, i.e. 0.1 second. The expression "long term" corresponds to the duration of the code-carrier filtering, conventionally lying between 60 seconds and 120 seconds.

The principle of this method relies on the formulation of a check of the integrity of the RTK position estimation, obtained on the basis of the GNSS signals carrier phases, starting from a less precise position, albeit one for which it was possible to be certain of the integrity, formulated on the basis of the GNSS code delays.

This consolidation relies on the assumption that the two positioning procedures established on the carrier phases and on the code delays are affected simultaneously by defects in generating the satellite signal, and therefore that:

any non-integrity detected by the algorithm for monitoring the position, calculated on the basis of the code delays, also induces a non-integrity of the position constructed on the basis of the carrier phase.

as long as the algorithm for monitoring the position calculated on the basis of the pseudo-distances declares the position dependable, then the position constructed on the basis of the carrier phase is potentially dependable, on condition that, on its side, it also satisfies constraints in respect of consistency between carrier phase measurements.

The precise positioning algorithm according to the invention comprises two main steps:

estimation of the floating ambiguities, based on the measurements of pseudo-distance of codes and their uncertainties, resulting from the conventional position resolution by least squares;

determination of the integer ambiguities of carrier phase around this first position in the domain of indeterminacy of the floating ambiguities, from which stems the resolution of the precise second position.

The integrity of the estimation of the precise position therefore implies that each of these two steps is itself dependable, therefore that:

the measurements of pseudo-distances on the code are dependable the measurements of phase on the carrier are dependable If the following assertions are labelled:

P: "The precise positioning is dependable",

Q1: "The algorithm for positioning on the code delay is dependable"

Q2: "The algorithm for positioning on the carrier phase is dependable"

It is equivalent to write, at each instant t that:

$P(t) => [Q1(t)\hat{}Q2(t)]$ or else, not $[Q1(t)\hat{}Q2(t)] => $ not $[P(t)]$ not $[Q1(t)]$ v not $[Q2(t)] =>$ not $[P(t)]$ "not $[Q1(t)]$" can be evaluated by the standard algorithms for checking integrity of the position obtained on the basis of the code pseudo-distances. The algorithm for checking "not $[Q2(t)]$" is the essential subject of the present invention.

This algorithm does not consist in an estimation of the residuals of carrier phase measurements because of the overly significant uncertainty relying on the resolution of the carrier phase integer ambiguities and because of the large number of combinations evaluated. The resolution of the phase integer ambiguities is effective only under the assumption that the phase measurements are all dependable, that is to say that there does not exist any measurement bias greater than the phase measurement uncertainty. On the other hand, in the presence of one or more phase measurement biases, the significant combinatorics of the integer ambiguities may give rise to convergence of the search algorithm on a non-dependable combination, while complying with constraints of reduced dispersion in the carrier phase measurement residuals.

To alleviate this difficulty, a two-stage approach is proposed:
- guarantee the integrity of the initial resolution, based on the filtering of the code pseudo-distance measurements the integrity of which has previously been verified by a standard algorithm (RAIM, . . . ),
- verify that at any instant the evolution of the carrier phase remains consistent with the velocity estimation conducted in parallel with the position estimation on the basis of the apparent-doppler measurements obtained by dividing the phase increments by the time interval considered.

Together, these two verifications make it possible to ensure that the initial precise position at a time T0 is dependable, and that the new phase measurements used to sustain the precise position at an instant T greater than T0 remain valid and dependable. This therefore reduces the risk of the carrier phase measurement becoming inconsistent with the code pseudo-distance measurement, and therefore of the precise position estimation not being dependable whereas the standard position measurement on the code would have been declared dependable.

The method according to the invention describes a possible, but not exclusive, implementation of the approach described hereinabove. The general principle of a positioning of RTK type relies on the precise estimation of the lever arm between a reference station of known position and the antenna of the user, on the basis of the differential measurements of phase of the carriers of the signals arising from the satellites.

The RTK procedure relying on differential measurements of carrier phase, it is considered that all the common biases between the reference station and the user can be cancelled and that the residual sources of loss of integrity are related to defects originating from local propagation. By way of examples, these defects are due to tropospheric disturbances or to those of the ionospheric front or to the multipaths of the signal or to antenna biases. The receiver biases common to all the satellites are also eliminated by double differencing, to the detriment of a sight axis.

This procedure is represented in FIG. 1. The two circled crosses respectively represent the positions of the reference station $A_R$ and the antenna of the user Au. The direction or "LOS", standing for "Line Of Satellite", of one of the satellites of the GNSS constellation is indicated by the white arrow. It is characterized by the vector $\vec{u}$. The dashed lines perpendicular to this direction represent the waveplanes $P_O$ of the signal emitted by this satellite. Two consecutive waveplanes are separated by the emission wavelength λ of this signal.

The baseline $L_B$ is the line joining the station to the user. It is represented by the vector $\vec{b}$. The direction of this baseline makes an angle θ with the LOS of the satellite. We denote by n the integer number of waveplanes separating the waveplane of the reference antenna from the antenna of the user, this number is also known by the name ambiguity. F is the fraction of wavelength remaining between the reference antenna and the antenna of the user. In the direction of the satellite, the differential phase or path length difference ΔO is defined geometrically by the projection or the scalar product of the length of the baseline in the direction of the satellite considered and therefore equals:

$$\Delta\Phi=(n+F)*\lambda=\vec{u}\cdot\vec{b}$$

Figure 2:
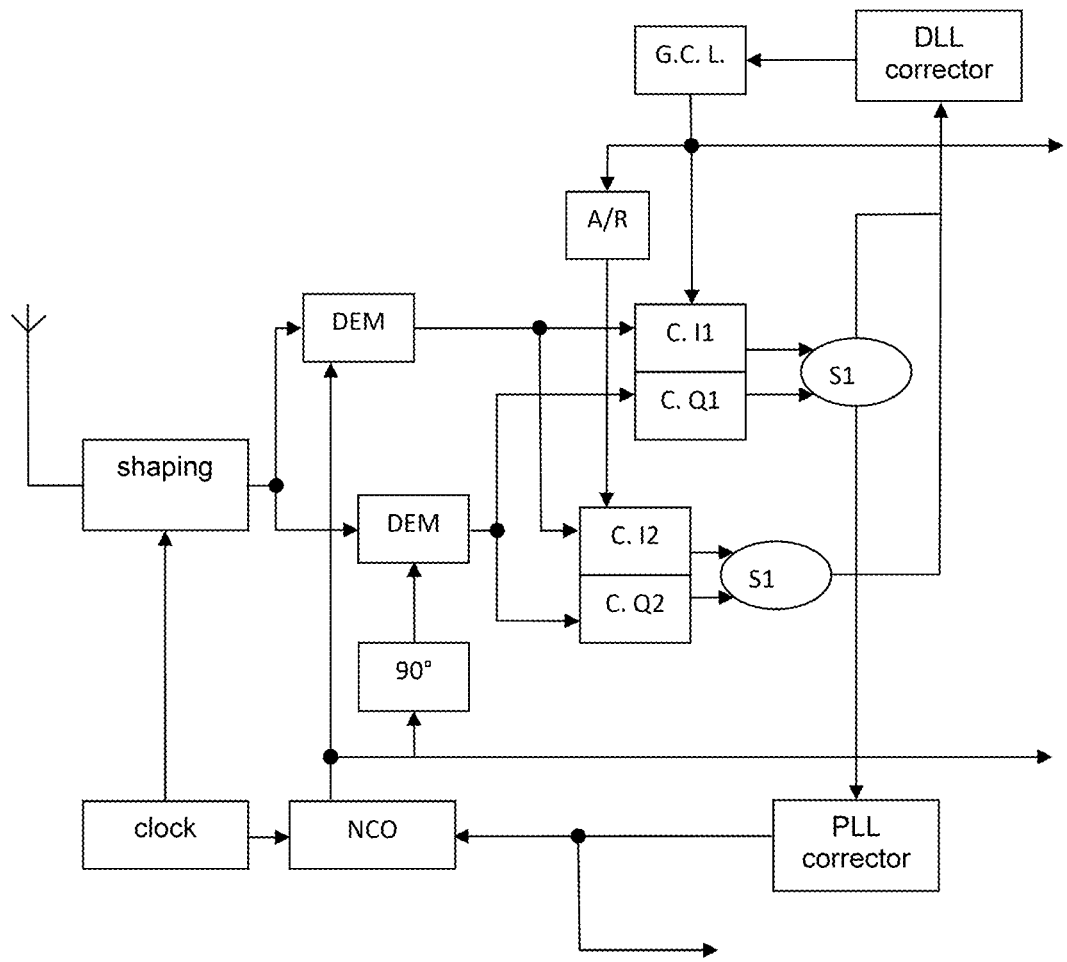
FIG. 2 represents the general schematic of a GNSS reception channel.

To deliver a phase measurement, a receiver receives and processes the satellite's GPS signal with the aid of a so-called "DLL" code-tracking loop, the acronym standing for "Delay-Locked Loop", and of a so-called "PLL" carrier-tracking loop, the acronym standing for "Phase-Locked Loop", as represented in FIG. 2. The various abbreviations of this FIG. 2 represent the following functions:
- Shaping: This function covers the set of functions making it possible to shape the signal received from the satellite into a utilizable signal. These are essentially the functions of filtering, demodulation, automatic gain correction or AGC and conversion of the analogue signal into a digital signal or ADC.
- Clock: This function delivers a reference clock signal.
- NCO: This abbreviation corresponds to the digital control oscillators.
- DEM: This abbreviation stands for demodulator.
- C.I and C. Q: These abbreviations represent the correlators making it possible to deliver the signal and the quadrature signal.
- G.C.L.: This abbreviation stands for: "Local Code Generator".

In the case of two antennas, the signals received demodulated by the code and the carrier may be written:

$$r_1(t)=s_1(t)+n_1(t)=a\cdot D(t)\cdot\exp j(2\pi ft+\varphi)+n_1(t)$$

$$r_2(t)=s_2(t)+n_2(t)=a\cdot D(t)\cdot\exp j(2\pi ft++2\pi f_0\tau+\varphi)+n_2(t)$$

where,
- s1(t) and s2(t) are respectively the satellite signals received by each antenna,
- n1(t) and n2(t) are respectively the noise received by each antenna,
- f is the residual carrier frequency,
- f0 is the carrier frequency received,
- φ is the signal's initial phase, indeterminate,
- D(t) is the sign of the datum which optionally modulates the carrier,
- a is the amplitude of the processed signal,
- τ is the wave propagation delay between the two antennas separated by a distance d and of incidence θ, such as defined previously. It equals, c being the speed of light:

$$\tau=\frac{d\cdot\cos(\theta)}{c}$$

Figure 3:
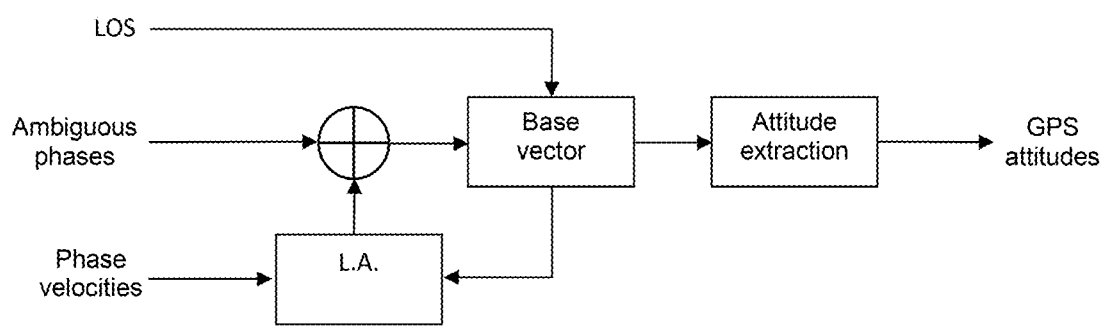
FIG. 3 represents the schematic of the determination of the GPS attitude.

The determination of the lever arm is obtained by calculation on the basis of the ambiguous phase measurements, by adding together the previously initialized and sustained ambiguity, and then by inverting the projection of the baseline in the directions of the various satellites, as is represented in the schematic of FIG. 3. In this schematic, the term "L.A." corresponds to "Lifting of Ambiguities". The LOS of the satellites arise from the so-called "PVT" data, the acronym standing for "Position, Velocity, Time" resolved by the GPS positioning and from the so-called "PVS" validation protocol, the acronym standing for "Protocol Validation System" calculated by the receiver on the basis of the navigation data received which are essentially the ephemerides or the almanac and of the resolved time.

The initial "Lifting of Ambiguities" consists in selecting for each satellite the integer number of wavelengths corresponding to the integer part of the GPS signal path length difference. This selection is taken in a search domain including at the outset all the possible ambiguity values. In the absence of a priori knowledge, the domain is bounded for each satellite by the integer number of wavelength contained in the baseline.

The velocity of the carrier in the local geographical frame can be estimated on the basis of the GNSS signals from the evolution of the signal phase observed on each of the sight axes of the satellites. This evolution of the phase is indicative of the variation of the doppler signal, itself linked to the evolution of the satellite-carrier distance. The carrier velocity can thus be solved by the least squares procedure, some ten or so GPS sight axes commonly being available, this number possibly even being increased by satellites of the other constellations.

Figure 4:
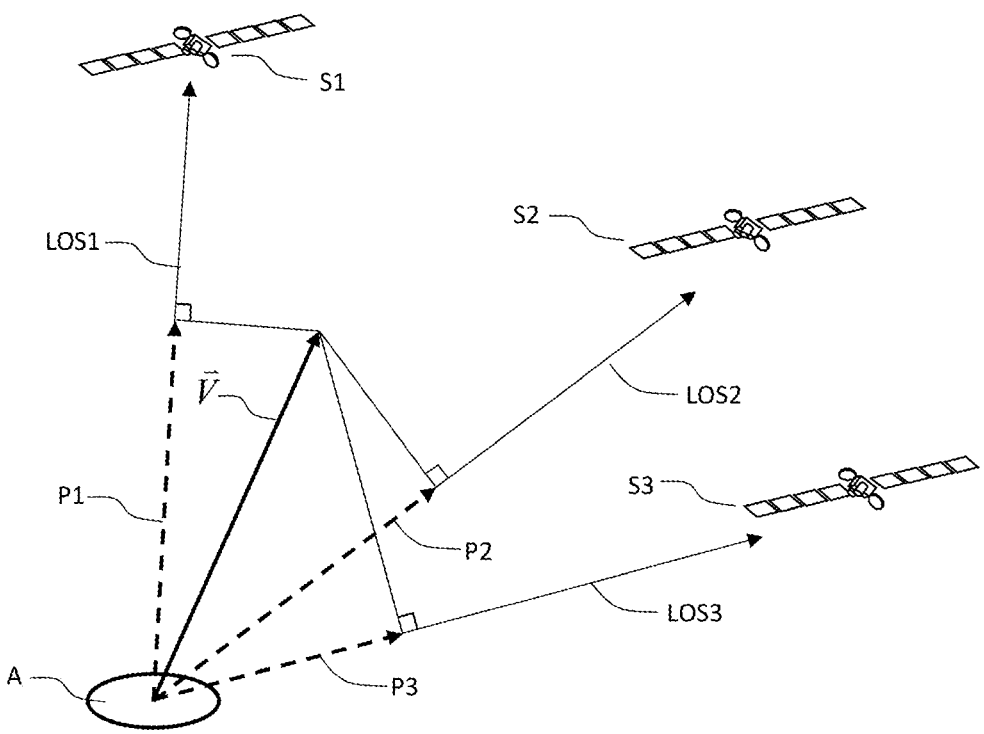
FIG. 4 represents the determination of the velocity vector of an antenna.

FIG. 4 illustrates this principle. Three satellites S1, S2 and S3 are seen from the antenna A which is moving at a velocity $\vec{v}$. The measurement of the three projections P1, P2 and P3 of the velocity vector $\vec{v}$ in the three directions LOS1, LOS2 and LOS3 makes it possible to retrieve the coordinates of the velocity vector of the antenna.

The method of checking the integrity of the precise position according to the invention comprises several steps. The essential step of the method consists, before any calculation of the lever arm position-wise between the reference station and the user established on the basis of the differential measurements of carrier phases which corresponds to the conventional processing of the RTK method, in verifying that the phases measured on the various satellites are consistent and compatible with the RTK processing.

For the phase measurements, one is interested only in the local consistency of the measurements between satellites, without considering the absolute errors related to the emission of the signals at the satellites level, errors related to synchronization, to the orbit since the common biases are eliminated by differencing.

The integrity of the reference phases measured and dispatched by the reference station being previously checked by the differential reference station, in a conventional manner, on the basis of the carrier phase residuals estimated on the basis of the precise knowledge of the position of the receiving antenna, the verification of the consistency of the local phase measurements of the various satellites ensures that the signals received are correctly mutually synchronized, and therefore that the differential phases can be used for the calculation of the user-reference station lever arm, thus demonstrating that no inconsistencies exist between the measurements of differential phases related to the various satellites that would originate from uncontrolled local phenomena around the user.

The difficulty with this approach pertains to the verification of the integrity of the carrier phases at the level of the user, if neither his position nor his velocity are known. To carry out this verification, use is made of the pseudo-distance measurements filtered by virtue of the carrier phase.

The principle consists in reducing the spatial domain in which the lifting of ambiguity of the carrier phases, which is necessary for resolving the RTK position, is carried out. Thus, if it is possible to find a combination of the phases with "integer ambiguities" that is compatible with the position obtained on the basis of the code measurements filtered with the carrier-doppler measurements, then the RTK position calculated is declared "dependable" in a protection radius which is compatible with the phase measurement errors, i.e. a few centimetres.

Figure 5:
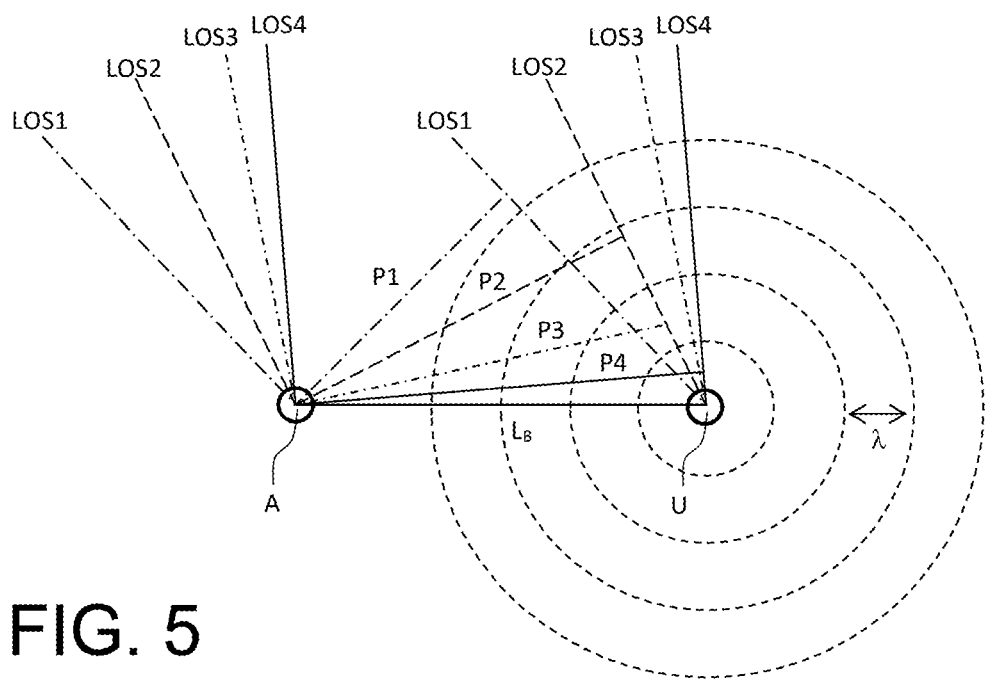
FIG. 5 illustrates the relation between the number of ambiguities of differential phase disparity and the direction of incidence of the signal.
Figure 6:
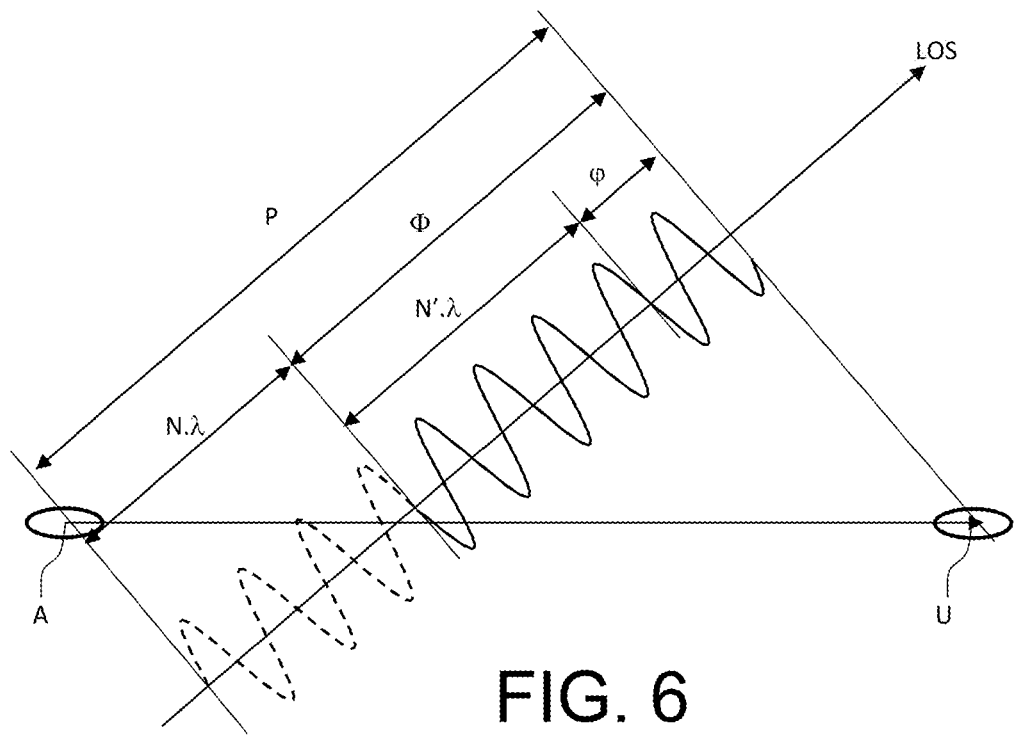
FIG. 6 illustrates the definition of the integer and floating phase ambiguities.
Figure 7:
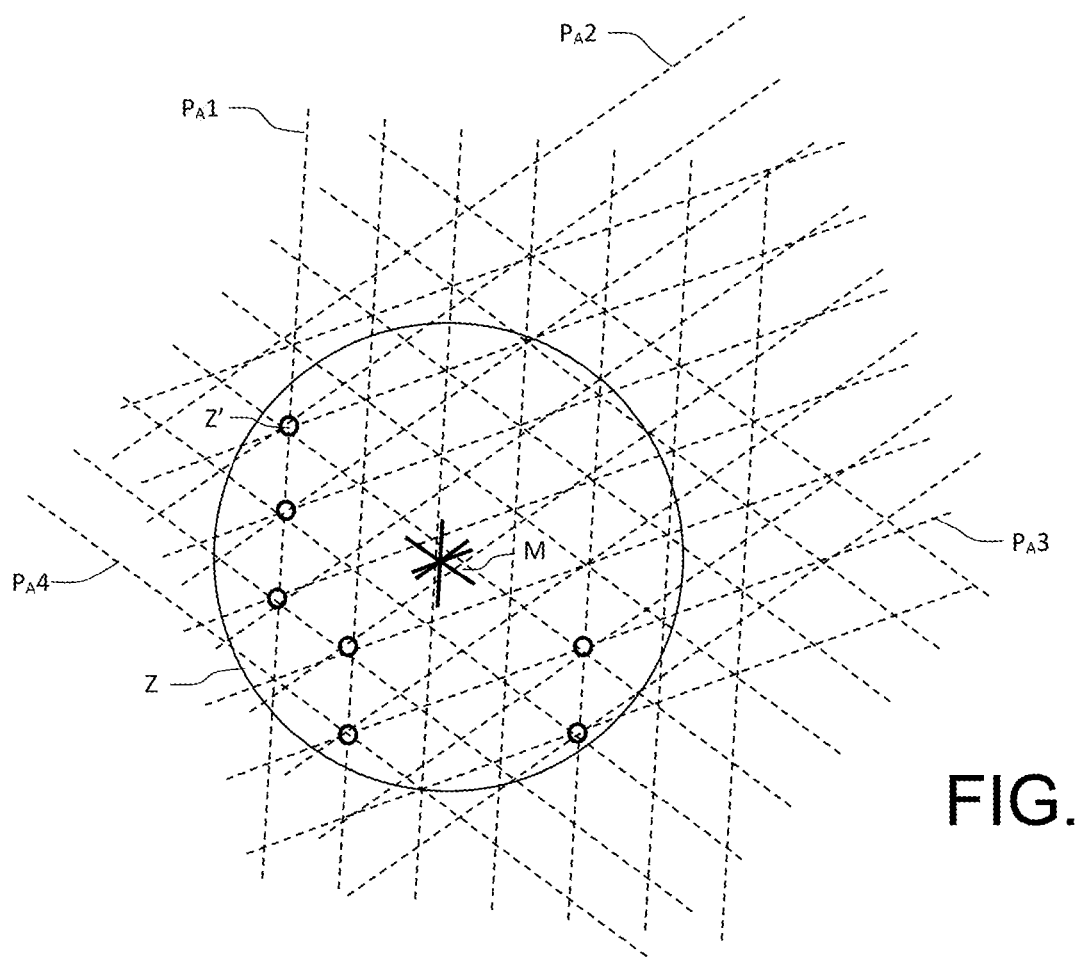
FIG. 7 is an example of searching for the integer phase ambiguities in the domain of uncertainty of the floating ambiguities.

FIGS. 5, 6 and 7 enable a better understanding of this principle. FIG. 5 represents an antenna A separated from a user U. The antenna and the user receive signals arising from a constellation of satellites. In FIG. 5, by way of example, the number of satellites is four. Each satellite is perceived in a direction denoted LOS. To each satellite there corresponds a different projection P on the baseline denoted $L_B$ in FIG. 5. The dashed concentric circles correspond to positioning uncertainties. Their radii are equal to an integer number of wavelengths $\lambda$, as indicated in FIG. 5.

FIG. 6 represents the decomposition of a projection P arising from a satellite in the line of direction LOS onto the baseline $L_B$. The measurement of this projection P decomposes into an observed value $\Phi$ is and an indeterminate value which is equal to an integer number N of wavelengths $\lambda$, also called phase integer ambiguities. By way of example, in the case of FIG. 6, N equals 3. The observed value $\Phi$ is also comprises a second integer number of wavelengths N', also called phase floating ambiguities, and a phase $\varphi$ which is equal to a fraction of a wavelength. By way of example, in the case of FIG. 6, N' equals 4. We have the relation:

$$P = \Phi + N \cdot \lambda = N' \cdot \lambda + \varphi + N \cdot \lambda$$

It is therefore necessary to lift the ambiguity in the indeterminate value, that is to say in the number N. To lift this indeterminacy, use is made of the fact that the various projections arising from the lines of direction of the various satellites must be mutually consistent. FIG. 7 illustrates this principle. It represents a measurement point M. The latter is surrounded by a circular zone Z of uncertainty of the floating ambiguities, which are calculated on the basis of the pseudo-distances. The series of dashed parallel lines indicate the position of the planes of the integer ambiguities for each satellite direction, these directions being perpendicular to these planes. In FIG. 7, four series of planes $P_A$ are represented and denoted $P_A1$, $P_A2$, $P_A3$ and $P_A4$. Inside the uncertainty zone, only a few uncertainty zones Z' represented by bold circles correspond to possible positionings. These zones Z' are calculated on the basis of the phase disparities and integer ambiguities that are possible. In the case of FIG. 7, these zones correspond to the joint intersections of four planes $P_A1$, $P_A2$, $P_A3$ and $P_A4$.

The filtered integrity and the radius of protection of the filtered position which are calculated on the basis of the filtered pseudo-distance measurements, by code-carrier filtering, is ensured on the basis:
of the checking of the integrity of the initial position, established on the basis of the pseudo-distances not filtered on the basis of the certified monitoring algorithms of RAIM, ARAIM, SBAS, etc. type,
of the checking of the integrity of the integrated doppler measurements which serve for the carrier code filtering of the pseudo-distances, of the checking of the integrity and of the radius of protection of the filtered position calculated on the basis of the pseudo-distances filtered via a simple RAIM.

The principle consists in verifying the conditions of implementation of the RTK, that is to say that the RTK algorithm is usable, having regard to the quality of the measurements. Accordingly, a check is carried out on the basis of the pseudo-distance measurements filtered by virtue of the carrier phase according to the following steps:

a) verification that the phase "integer ambiguities" search space, first step necessary in order to reduce the domain of exploration of the combinations between the inter-satellite measurements, is actually reduced to the positional uncertainty domain, calculated on the basis of the pseudo-distances. This compactness is ensured via the checking of positional integrity on the basis of the pseudo-distance measurements. Indeed, the use of non-dependable arrival time measurements would lead to retaining erroneous integer phases in the positional uncertainty domain b) verification that the integrated pseudo-distance measurements are not affected by errors related to possible biases in the integrated dopplers derived from the carrier phase, that it is possible to carry out on the basis of the integrity check of the filtered position, RAIM applied to the filtered pseudo-distance measurements. It is thus verified that the evolution of the relative doppler or carrier phase is consistent on all the satellite axes. If some integrated pseudo-distance measurements are not consistent, then it is deduced therefrom that the measurements of corresponding integrated doppler and therefore the elementary phases likewise undergo local deformations such as multipath or interference effects, effects of ionospheric fronts, cycle hops, which in fact prohibit their use for calculating the differential phase of the RTK c) if the previous two steps are actually negotiated, it is possible to apply the equivalent of an RAIM to the differential phase residuals which makes it possible to ensure the final integrity of the differential-position calculation and to associate a protection radius therewith, in an entirely similar way to the conventional RAIM in pseudo-distance. The latter verification makes it possible to take into account the errors which do not affect the first two tests, and which would pertain to possible dispersions in the differential measurements of phase arising for example from the dispersion of the responses in terms of phase of the RF stages of the receiver, which can differ according to satellites and which correspond to antenna responses, doppler effects on RF transfer function, etc.

The method according to the invention consists in putting in place the various processing means making it possible to ensure that the evolution of the phase of the carrier is consistent with the evolution of the phase of the code, with a view to transposing by equivalence the integrity certified on the position in terms of code phase, to a position integrity in terms of carrier phase.

Figure 8:
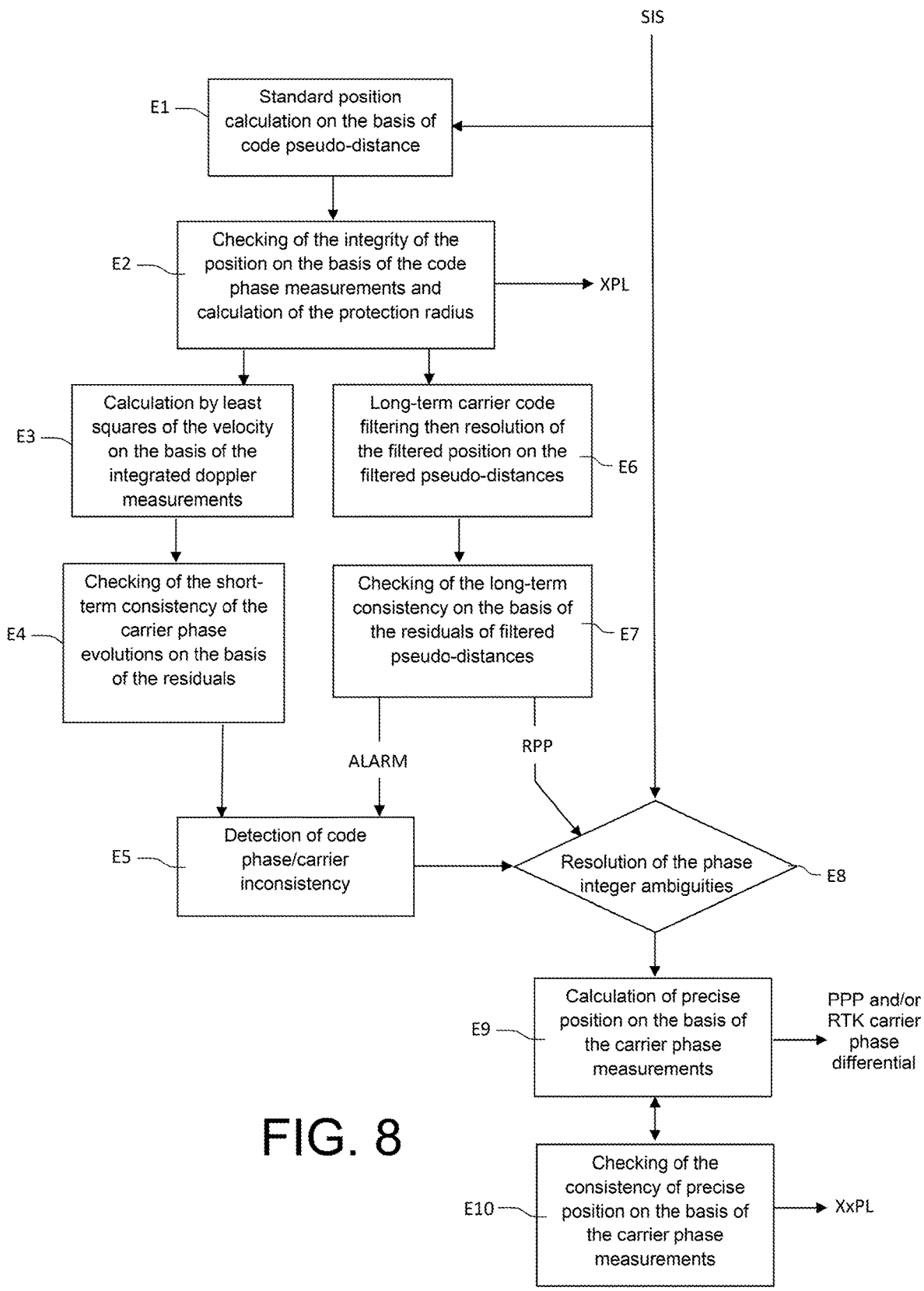
FIG. 8 represents the entirety of the positioning method of RTK type according to the invention.

The various steps of the method are represented strung together in FIG. 8:

Step E1: On the basis of the data arising from the satellites, so-called "SIS" data, the acronym standing for "Signal In Space", calculation of the standard position on the basis of code pseudo-distances.

Step E2: Carrying out of a first check of the integrity on the basis of the previous code pseudo-distance measurements. This step makes it possible to ensure that all the satellites participating in the PVT are dependable, in a calculated protection radius.

Steps E3 and E4: Verification that the associated integrated doppler measurements are likewise dependable, through an integrity check of the GNSS velocity, such as defined previously. This test makes it possible to detect the short-term appearance of inconsistencies in the carrier phase increment measurements. Such an inconsistency in the evolution implies a short-term integrity defect in the absolute phase measurement of the carrier.

Steps E6 and E7: Verification of the consistency of the code phase evolutions and carrier phase evolutions, by a second check of integrity carried out on the filtered pseudo-distance measurements. This test makes it possible to detect the long-term appearance of biases arising from slow drift, in the carrier phase increment measurements and to verify that it is possible to resolve the phase integer ambiguities in the uncertainty domain or protection radius calculated on the filtered position Step E5: Carrying out of a last check on the basis of the carrier phase measurements arising from the resolution of the precise point corresponding to the residuals in phase disparity of the lever arm between user antenna and reference antenna.

The following two verifications, conducted jointly, make it possible to verify the consistency of the phase evolutions and code evolutions:

Verification of the consistency of the short-term evolution, based on the residuals of phase increments or integrated doppler which are obtained after resolution of the velocity on the basis of the carrier phase, so as to verify the consistency of the short-term evolution;

Verification of the consistency of the medium-term evolution, based on the residuals of increments of filtered pseudo-distances which are obtained after resolution of the position filtered on the basis of the pseudo-distance measurements filtered by the carrier, so as to verify the long-term consistency.

Per se, the test of the distribution of the velocity residuals, carried out on the integrated dopplers, does not make it possible to quantify a global integrity risk on the velocity, since the occurrence of the feared events on the carrier phase is not known, but does despite everything make it possible to verify with a given confidence that, in the short term, the calculated velocity is consistent with the integrated-doppler measurements over the satellites as a whole.

This test on the velocity residuals therefore makes it possible to ensure that the integrated-doppler measurements are not affected by errors, and therefore that, as long as the test on the position residuals is itself positive, there is no reason to suspect any inconsistency between evolutions of carrier phase and evolution of code phase, thus rendering the measurements of carrier phase usable to carry out precise and dependable positioning, with the same risk of non-integrity as that associated with the position.

This test makes it possible to identify the rapid appearance of an error since the residuals are calculated in the short term, so-called "snapshot" measurements. On the other hand, this test does not always make it possible to detect slow drifts of carrier phase, which would cause the velocity to veer gently towards an erroneous value.

To alleviate this limitation, it is therefore appropriate to put in place a consistency test of the long-term carrier and code phase evolutions, on one or more temporal depths compatible with evolutions that are not detectable by the short-term test. For example, if it is considered that evolutions of less than 5 cm/s would not be detectable in the short term with the usual non-detection risk constraints, then a minimum observation depth of 100 s is necessary in order to be able to detect a drift of the carrier phase of greater than 5 m, corresponding to $5\sigma$ of the pseudo-distance standard deviation.

This test makes it possible to ensure that, even in the case of a pernicious slow drift, very improbable in the case of a defect in a single satellite, and therefore implying intent, the error in the final position arising from the carrier phase remains of the order of that tolerated, that is to say in the protection radius on the position on the code phase.

Of course, the algorithm used for the precise position estimation will likewise be susceptible to non-integrity.

The second check on the carrier phase residuals of the precise position resolution might not be necessary, considering that the previous tests ensure the integrity of the phase measurements used by the precise position calculation algorithm. However, the phase of the carrier is subjected to propagation imperfections such as scintillation and ionospheric divergence, tropospheric differential drifts, multipaths which introduce additional noise liable to disturb the resolution of the integer ambiguities which is applied for the carrier phase based positioning algorithms.

It is then no longer a matter of detecting a satellite fault, but of verifying the relevance of the precise solution, by checking the consistency of the disparities of double difference of carrier phase arising from the algorithm for resolving the precise position by the least squares procedure.

The principle of monitoring the resolved RTK position uses a statistical test relying on the redundancy of the phase measurements. This test is of the same nature as the test used for a conventional PVT, the so-called Khi-2 test. It is applied on each occurrence of attitude measurement, on the whole set of available sight axes, with a view to identifying possible degradations in the attitude measurement precision, performed by an attitude RAIM.

It is in fact supplemented with a projection of the threshold of detection of the residuals, onto the lever arm measurements axis, making it possible to associate an imprecision in the relative position of the carrier with the imprecision in the differential-phase residuals.

A "radius of protection of the relative position" or "RPP" can then be introduced, such as indicated in FIG. 8, and this makes it possible to check the availability of the attitude RAIM, in relation to the chosen false alarm and non-detection probabilities.

It is then possible to pass to step E8 which consists of the resolution of the integer phase ambiguities, such as was described previously. Successfully accomplishing the resolution of the integer ambiguities in the space of uncertainty of the filtered position, obtained after filtering of the pseudo-distances by carrier-phase evolutions whose integrity has been verified according to steps E3 and E4, makes it possible to ensure that this "real time kinematic" solution remains dependable.

Step E9 consists in calculating the precise position on the basis of the measurements of carrier phase and, finally, step E10 consists in checking the consistency of the measurements of precise position on the basis of the measurements of carrier phase. The latter step makes it possible to take into account the errors which do not affect the first two tests, and which pertain to possible dispersions in the differential phase measurements used for the precise-position calculation.

The invention claimed is:

1. A method of checking an integrity of an estimation of a position of a mobile carrier, the position being established by a satellite-based positioning measurement system, the estimation being obtained by a real time kinematic (RTK) procedure, the procedure being based on measurements of a first carrier phase of global navigation satellite system (GNSS) signals arising from satellites, the method verifying that a carrier phase measurement is consistent with a code pseudo-distance measurement, wherein the method comprises:

calculating an initial position and an initial time of the carrier, on the basis of pseudo-distances estimated on sight axes of the satellites, based on time measurements received and carried by spreading codes of the signals;

verifying an integrity of a resolution of the initial position and of the initial time, on the basis of satellite pseudo-distances calculated on the basis of a standard algorithm for monitoring satellite faults of receiver autonomous integrity monitoring (RAIM) type;

calculating a velocity of the carrier, at a plurality of observation instants, on the basis of apparent-doppler measurements estimated on the sight axes, on the basis of the first carrier phase measurements;

verifying that, at each of the observation instants, a short-term evolution of a second carrier phase of signals received on each of the sight axes is consistent with the calculated velocity;

verifying that, at each of the observation instants, a filtered position obtained on the basis of long-term filtered measurements of pseudo-distance through the second carrier phase is dependable due to a measurement bias being greater than a phase measurement uncertainty.

2. The method of claim 1, further comprising:
resolving phase integer ambiguities in an uncertainty domain associated with the filtered position.

3. The method of to claim 1, further comprising:
calculating the RTK position, on the basis of the first carrier phase measurements; and
verifying a final integrity of the position by (i) applying the standard algorithm to differential phase residuals and (ii) associating a protection radius therewith.

* * * * *